United States Patent Office 3,148,976
Patented Sept. 15, 1964

3,148,976
PROCESSING IMPURE URANIUM
Robert J. Teitel, Northridge, Calif., assignor to The Dow Chemical Company, Midland, Mich., a corporation of Delaware
No Drawing. Filed Dec. 11, 1961, Ser. No. 158,602
7 Claims. (Cl. 75—84.1)

This invention relates to an improved method for purifying impure uranium or an alloy of uranium and is particularly concerned with a pyrometallurgical process for reducing the level of impurities such as fission products in impure uranium or uranium alloys, and recovering the uranium as the metal or as a simple uranium-aluminum binary alloy.

For the purposes of the specification and claims, the impure uranium or the uranium alloy to be subjected to the process of the invention is referred to as uranium metal.

Heretofore, spent nuclear reactor fuel elements and fuel element fabrication plant scrap have been refined by chemical rather than metallurgical processing methods. Chemical methods are subject to certain serious disadvantages such as the use of large quantities of corrosive acid solutions, the handling of large volumes of solutions, the numerous processing steps, the difficulties in handling highly radioactive materials during lengthy processing, the necessity to reduce purified uranium compounds to the metallic state in the process of obtaining refined metal, and the problem of concentrating radioactive waste solutions for disposal and storage. These problems are overcome by the use of the pyrometallurgical method hereinafter disclosed and claimed.

It is an object of the present invention to provide a method widely adaptable to purifying uranium metal and recovering uranium therefrom.

It is another object of the invention to provide a method by which it is inherently possible to refine uranium metal and nearly quantitatively recover uranium therefrom.

It is another object of the invention to provide a method for processing uranium metal and recovering the uranium as metallic uranium or as a uranium alloy.

It is a further object of this invention to provide a method for purifying uranium metal which is readily carried out by remote control.

It is a still further object of this invention to provide a method for purifying uranium metal by which radioactive contaminants removed from the treated uranium metal are recovered in a concentrated, readily disposable form.

Other objects and advantages of the invention will become apparent to those skilled in the art upon becoming familiar with the following description and claims.

This invention is based upon the discovery that by heating a uranium metal together with an aluminum-copper alloy, hereinafter more fully defined, so as to form a molten uranium-aluminum-copper alloy, and subsequently heating this alloy with at least 5 weight percent of magnesium, based on the combined amount of aluminum and copper present, a magnesium-aluminum-copper alloy melt and a uranium-aluminum precipitate are formed which can be separated by physical methods. Upon processing an impure uranium metal, such as one containing typical fission products, the separated uranium-containing precipitate is found to have a substantially reduced level of impurities, such as the fission products, compared to the starting material.

For the purposes of the specification and claims, an aluminum-copper alloy is defined as an alloy consisting of at least 55 percent by weight of aluminum and at least 15 percent by weight of copper, and not more than about 5 percent of other metals. The preferred alloy consists of 30 to 40 percent by weight of copper and the balance aluminum.

In this field of endeavor, it is usually an economic necessity to obtain good uranium recoveries. Uranium losses in the present process occur (1) if all the uranium is not taken up initially by the aluminum-copper alloy, or (2) if the uranium is not quantitatively precipitated from the magnesium alloy formed with aluminum-copper alloy according to the process.

Thus, it is usually essential that the uranium content of the impure uranium metal alloys with the aluminum-copper alloy. Uranium metal, then, which may be processed according to the invention, includes uranium, as well as uranium alloys which are substantially completely alloyable with aluminum-copper alloy. If the uranium metal is not entirely miscible with the aluminum-copper alloy at working temperatures that are reasonable to use in working with available containers formed of molten metal-resistant materials of construction, it must at least be corrodible by the aluminum-copper alloy so that the uranium content can be taken up by the aluminum-copper alloy. It is desirable that not more than about 10 percent by weight of the uranium alloy fails to alloy with the aluminum-copper alloy at the alloying or corroding temperature (usually 700°–1000° C.), thus fairly assuring complete dissolution or extraction of the uranium values in the impure metal.

In order to obtain efficient recoveries of uranium (99 percent or better), the uranium metal used as starting material should contain at least about 0.3 percent by weight of uranium.

Metals which are soluble in the aluminum-copper "solvent" used to dissolve the uranium and which coprecipitate markedly with uranium in the present process, for example, ruthenium, are generally not well separated from uranium according to the present invention. Unless such metals are desired or at least tolerated in the final uranium product, uranium metals containing such impurities in substantial amounts (more than a trace) are less advantageously treated according to the present process.

In carrying out the process of the invention, the uranium metal is mechanically reduced and dried, and degreased, if indicated, and then heated together with at least four parts of aluminum-copper alloy per part of uranium in the uranium metal to a temperature sufficiently great for a uranium-aluminum-copper melt to form. Generally, a temperature of at least 550° C. is required. At higher temperatures, such as 600°–900° C., alloying takes place more rapidly. Desirably, heating is carried out in an inert atmosphere to avoid oxidation of uranium, a rather readily oxidized metal. If the uranium metal consists of spent nuclear fuel, provision should be made to collect volatile fission products released as the metal melts. A sample of a suitable apparatus for use in carrying out the method of the invention is described in my copending application Serial No. 825,389, filed July 2, 1959, now U.S. Patent 3,053,650.

The aluminum-copper alloy used in the present process contains from 55–85 percent of aluminum and from 15–40 percent of copper. If desired, small amounts of other metals such as zinc or magnesium may be incorporated in the alloy to modify the alloying properties thereof. However, it is usually simpler to use a binary aluminum-copper alloy. If the uranium metal being processed already contains aluminum, the aluminum-copper alloy should be selected so that the melt formed on heating the uranium metal and the aluminum-copper alloy together does not contain more than about 5 parts of aluminum per part by weight of copper, else subsequent uranium recoveries will tend to be adversely affected.

If the uranium metal is not entirely alloyed or "dissolved" in the molten aluminum-copper alloy, and solid portions or particulates remain, a greater quantity of aluminum-copper alloy may be added as required to take up any uranium held by the solid material. Otherwise, the solids are separated by one of the known methods, such as, filtration, centrifugation or settling, as well understood in the pyrometallurgical art. The solidification temperature of the resulting aluminum-copper alloy is generally in the range of about 550°–650° C.

Solids-free uranium-aluminum-copper alloy, containing up to 25 percent by weight of uranium and the balance aluminum-copper alloy as defined hereinabove, is heated with magnesium to bring about formation of a molten magnesium-aluminum-copper alloy and precipitation of uranium as a uranium-aluminum intermetallic compound, such as $UAl_3$. The amount of magnesium used, by weight, is equal to at least 5 percent by weight of the combined weight of the aluminum and copper present, and preferably from 20–200 percent by weight in order to obtain better uranium recovery, though more magnesium may be used if desired. With higher magnesium additions, uranium recovery efficiency tends to be lowered, although purification of the uranium may be, and usually is, more complete.

The uranium-aluminum-copper alloy and magnesium may be brought together in any suitable way, i.e., with either one or both of the alloy and magnesium in molten or solidified form, and heated together under an inert atmosphere at a temperature sufficient for a melt of magnesium, aluminum and copper to form in a reasonable time, such as one to two hours. Generally, a temperature in the range of about 600°–900° C. is satisfactory. At temperatures above about 950° C., the corrosive properties of aluminum tends to become a problem with present day container materials. With superior container materials, higher temperatures may be used if provision is made to retain the relatively volatile magnesium. During the heating period, a melt of magnesium-aluminum-copper alloy is formed and at least a part of the uranium is precipitated. Then the metal mixture is allowed to cool to a temperature slightly above the solidification temperature of the magnesium-aluminum-copper alloy and held there for one hour or more, and preferably two to six hours, to permit additional precipitation of uranium before separating the uranium-containing precipitate, thus improving the uranium recovery efficiency. Solidification of the magnesium-aluminum-copper alloy generally occurs in the range of about 500°–800° C.

The precipitated uranium-containing solids, which usually consists of $UAl_3$, may be recovered by centrifugation; by settling, solidification as a casting, and cutting off of the appropriate lower portion of the casting; or by filtration through a graphite frit filter, as in the apparatus described in the said copending application. The filtration method generally requires the use of only a moderate pressure differential (e.g., about 22 p.s.i.) across the graphite frit filter, and has the advantage that the uranium precipitate may be washed on the filter to remove metals other than uranium, i.e., residual melt consisting mainly of magnesium, aluminum and copper. Removal of the residual melt is desirable since it contains the impurities extracted from the uranium in the process. Unless it is desired to recover the uranium as a uranium-aluminum alloy, the washing process is desirably carried out in such a manner as to dissociate the uranium-aluminum compound and wash away the aluminum.

Washing is carried out by contacting the precipitate with magnesium for a period of 15 minutes to an hour or more, and then drawing the molten magnesium through the filter. Alloys of magnesium with zinc or cadmium can also be used, wherein the magnesium content is at least 50 percent. If the zinc or cadmium content is higher than 50 percent, intermetallic compounds form with a concomitant loss in washing efficiency and the loss of uranium values to the solvent is increased.

For the purposes of the specification and claims, magnesium and magnesium alloys containing at least 50 percent of magnesium and the balance either of zinc or cadmium, are hereinafter referred to as magnesium metal.

Generally, from 30–100 parts by weight of magnesium metal per part of uranium provides an adequate volume of magnesium metal to wash out most of the original magnesium-aluminum-copper melt and to dissociate the uranium-aluminum intermetallic compound.

If desired, the washing step may be repeated one or more times to obtain more complete removal of copper and co-precipitated metals. Each wash, however, results in a small but finite loss of uranium to the magnesium metal.

Washing may also be carried out by contacting the uranium precipitate with molten magnesium metal in a crucible or pot in which the mixture may be stirred, or agitated, as by gas sparging. Then, after allowing the uranium precipitate to settle, the supernatant melt may be removed by allowing the melt to cool and solidify and then cutting off the settled layer. This process is relatively simple, but less complete separation of melt and precipitate is obtained.

The washed precipitate of uranium is freed of magnesium metal by distilling off the magnesium metal, preferably at reduced pressure, as well understood in the art, and as described in the said copending application, leaving a purified uranium in particulate form which may be arc melted to massive form, or readily alloyed with metals used in making a suitable fuel alloy, e.g., metals such as chromium.

EXAMPLES

While the following examples serve to illustrate the process of the invention, the process is not to be construed as limited thereto.

An aluminum-copper alloy consisting of 55 parts of aluminum per 25 parts of copper was placed in a graphite crucible in a muffle furnace along with sufficient uranium to make a 20 percent by weight uranium alloy. The metals were heated together under an inert atmosphere at 800° C. with occasional agitation during a four hour period. The alloy was then filtered and the apparatus was allowed to cool. The alloy was examined and placed again in the furnace. The alloy was then heated to 750° C. and sampled at temperatures in the range of 750°–575° C. At each temperature, the molten alloy was agitated and held at the sample temperature for two hours before inserting into the melt an inverted, impervious, graphite sampling cup having a graphite frit filter press-fitted in the throat thereof, while the gas pressure above the melt was increased. Each sample obtained was subjected to chemical analysis. The alloy was then allowed to settle quietly at 600° C. for one hour, during which time part of the uranium content of the alloy precipitated. The alloy was allowed to cool and solidify and was removed from the furnace for metallographic examination. One-half of the solidified alloy was returned to the furnace along with a quantity of magnesium weighing 1.5 times the weight of this portion of the alloy. The magnesium and the alloy were heated together to a temperature of 750° C. for two hours with agitation and under an inert atmosphere. During this time, a melt consisting primarily of magnesium, aluminum and copper was formed, and most of the uranium was precipitated as a particulate solid in the form of a uranium-aluminum intermetallic compound. The solubility of uranium in the melt was determined by samples taken at temperatures of 750° C., 650° C. and 575° C., respectively, each sample being taken after a two-hour equilibrium period. The melt was then allowed to settle and cool and solidify without further agitation. The apparatus was dismantled and the lower portion of the solidified metal was examined to identify the precipitated solid phase. The results of the solubility determinations of uranium in molten aluminum-copper alloy and in molten magnesium-aluminum-copper alloy are listed in the following table.

*Solubility Determinations*

| Liquid Compositions (Wt. Percent) | | | Melt Temp. (° C.) | U Concentration (Wt. Percent) |
|---|---|---|---|---|
| Cu | Al | Mg | | |
| 25.96 | 54.49 | -------- | 750 | 18.38 |
| 22.80 | 60.06 | -------- | 700 | 15.50 |
| 20.38 | 65.79 | -------- | 650 | 13.42 |
| 17.19 | 72.93 | -------- | 600 | 10.00 |
| 16.92 | 73.58 | -------- | 575 | 9.87 |
| 19.2 | 30.2 | 50.6 | 750 | .2043 |
| 13.9 | 20.4 | 65.7 | 650 | .0147 |
| 12.1 | 18.5 | 69.4 | 575 | .0044 |

The results shown in the foregoing table indicate that appreciable amounts of uranium are soluble in aluminum-copper alloys containing 25 weight percent of copper. Upon the addition of magnesium, the weight ratio of magnesium to melt being 1.5, the solubility of uranium in the melt is reduced to the order of 50 parts per million at temperatures just above the freezing temperature of the melt. On carrying out this process in a filtration unit, over 99.5 percent by weight of the uranium is retained in particulate form on the filter.

Metallographic examination of the settled layer from the magnesium-aluminum-copper melt showed that the particular material which settled out was $UAl_3$.

To further illustrate the process of the invention, 179 grams of an alloy consisting of 70 percent by weight of aluminum and 30 percent by weight of copper, 21 grams of lightly irradiated uranium, and 5 milligrams each of cerium, ruthenium and strontium are placed in a graphite crucible in a muffle furnace under an inert atmosphere and heated to 675° C. and held at that temperature for three hours. The resulting alloy contains about 10 percent by weight of uranium and 25 parts per million each of cerium, ruthenium and strontium. The so-prepared alloy, along with 600 grams of magnesium, is placed on a graphite frit filter in a filter sleeve and over a graphite crucible in a muffle furnace, and heated under an inert atmosphere to a temperature of 710° C. for 2.5 hours, with occasional agitation being accomplished by periodic gas sparging. At the end of the heating period, the contents of the graphite filter sleeve are allowed to cool to 545° C. After letting the resulting $UAl_3$ precipitate settle for about six hours, the gas pressure above the filter is increased, forcing the melt through the filter and into the graphite crucible. After the apparatus has cooled to room temperature, the filtrate is removed for analysis. Another graphite crucible is then placed under the filter sleeve in the furnace and 200 grams of magnesium are placed on the residue in the filter sleeve. The apparatus is then heated to 750° C. under an inert atmosphere and agitated by gas sparging. After about one hour, the melt is cooled to 500° C. and held at that temperature for an additional hour before increasing the gas pressure above the filter to force the melt into the crucible below the filter. The apparatus is then allowed to cool and both the residue on the filter and the filtrate in the crucible are examined and analyzed. Examination of the residue in the filter shows that 99.5 percent of the uranium is recovered partly as uranium, along with some $UAl_3$, the proportions of aluminum in the residue being about 3 percent by weight and the proportions of residual magnesium being about 20 percent by weight.

Radiochemical analysis of both of the the filtrates and of the residue on the filter, shows that about 9/10 of the cerium, 3/10 of the ruthenium, and over 1/2 of the strontium are removed from the uranium in the present process. Further washing of the uranium residue on the filter with magnesium will improve the separation of fission products from the uranium.

Having now described the process of the present invention, other embodiments thereof will at once be apparent to those skilled in the art, and the scope of the invention is to be considered limited only by the scope of the claims hereinafter appended.

I claim:

1. In the method of processing an impure uranium metal selected from the group consisting of uranium and uranium alloys, the steps which comprise: heating the uranium metal with at least 4 parts of an aluminum-copper alloy per part of uranium in the said uranium metal, whereby the uranium metal and aluminum-copper alloy are made molten and substantially entirely mutually miscible, said aluminum-copper alloy consisting essentially of at least 55 percent by weight of aluminum and at least 15 percent by weight of copper and not more than 5 percent by weight of other metals; and heating the so-formed melt together with sufficient magnesium to form a molten magnesium-aluminum-copper melt and to cause precipitation from the melt of a uranium-containing solid.

2. In the method of processing an impure uranium metal selected from the group consisting of uranium and uranium alloys, the steps which comprise: heating the uranium metal with at least 4 parts of an aluminum-copper alloy per part of uranium in the said uranium metal to a temperature above about 550° C., whereby the uranium metal and aluminum-copper alloy are made molten and substantially entirely mutually miscible, said aluminum-copper alloy consisting essentially of at least 55 percent by weight of aluminum and at least 15 percent by weight of copper and not more than 5 percent by weight of other metals; and heating the so-formed melt together with sufficient magnesium to form a molten magnesium-aluminum-copper melt and to cause precipitation from the melt of a uranium-containing solid.

3. The method of purifying an impure uranium metal selected from the group consisting of uranium and uranium alloys which comprises: heating the uranium metal with at least 4 parts of an aluminum-copper alloy per part of uranium in the said uranium metal to a temperature above about 550° C., whereby the uranium metal and aluminum-copper alloy are made molten and substantially entirely mutually miscible, said aluminum-copper alloy consisting essentially of at least 55 percent by weight of aluminum and at least 15 percent by weight of copper and not more than 5 percent by weight of other metals; heating the so-formed melt together with sufficient magnesium to form a molten magnesium-alumium-copper melt and to cause precipitation from the melt of uranium-containing solids; and separating the uranium-containing solids from the melt.

4. The method of purifying an impure uranium metal selected from the group consisting of uranium and uranium alloys which comprises: heating the uranium metal with at least 4 parts of an aluminum-copper alloy per part of uranium in the said uranium metal to a temperature above about 550° C., whereby the uranium metal and aluminum-copper alloy are made molten and substantially entirely mutually miscible, said aluminum-copper alloy consisting essentially of at least 55 percent by weight of aluminum and at least 15 percent by weight of copper; heating the so-formed melt together with sufficient magnesium to cause formation of a magnesium-aluminum-copper melt and precipitation of an aluminum-uranium intermetallic compound; and separating the said aluminum-uranium intermetallic compound from the melt.

5. The method of purifying an impure uranium metal selected from the group consisting of uranium and uranium alloys which comprises: heating the uranium metal with at least 4 parts of an aluminum-copper alloy per part of uranium in the said uranium metal to a temperature above about 550° C., whereby the uranium metal and aluminum-copper alloy are made molten and substantially entirely mutually miscible, said aluminum-copper alloy consisting essentially of at least 55 percent by weight of aluminum and at least 15 percent by weight of copper and not more than 5 percent by weight of other metals; and heating the so-formed melt together with sufficient magnesium to cause formation of a magnesium-aluminum-copper melt and precipitation of an aluminum-uranium intermetallic compound therefrom; separating the said aluminum-uranium intermetallic compound from the melt; and heating the separated intermetallic compound to distill magnesium therefrom.

6. The method of purifying an impure uranium metal selected from the group consisting of uranium and uranium alloys which comprises: heating the uranium metal with at least 4 parts of an aluminum-copper alloy per part of uranium in the said uranium metal to a temperature above about 700° C., whereby the uranium metal and aluminum-copper alloy are made molten and substantially entirely mutually miscible, said aluminum-copper alloy consisting essentially of at least 55 percent by weight of aluminum and at least 15 percent by weight of copper and not more than 5 percent by weight of other metals; and heating the so-formed melt together with sufficient magnesium to cause formation of a magnesium-aluminum-copper melt and precipitation of an aluminum-uranium intermetallic compound therefrom; separating the said aluminum-uranium intermetallic compound from the melt; washing the separated intermetallic compound with a molten magnesium metal selected from the group consisting of magnesium and magnesium alloys consisting of at least 50 weight percent of magnesium and the balance being a metal selected from the group consisting of zinc and cadmium; and heating the washed solid to distill the said magnesium metal therefrom.

7. The method of purifying an impure uranium metal selected from the group consisting of uranium and uranium alloys which comprises: heating the uranium metal with at least 4 parts of an aluminum-copper alloy per part of uranium in the said uranium metal to a temperature above about 550° C., whereby the uranium metal and aluminum-copper alloy are made molten and substantially entirely mutually miscible, said aluminum-copper alloy consisting essentially of 30–40 percent by weight of copper and the balance aluminum; and heating the so-formed melt together with at least 5 weight percent of magnesium, based on the combined weight of aluminum and copper present, to cause formation of a magnesium aluminum-copper melt and precipitation of an aluminum-uranium intermetallic compound; and separating the said aluminum-uranium intermetallic compound from the melt.

References Cited in the file of this patent

UNITED STATES PATENTS

| | | |
|---|---|---|
| 2,778,730 | Spedding et al. | Jan. 22, 1957 |
| 2,934,425 | Knighton et al. | Apr. 26, 1960 |
| 3,034,889 | Spedding et al. | May 15, 1962 |
| 3,053,650 | Teitel | Sept. 11, 1962 |